United States Patent
Scior

Patent Number: 5,558,221
Date of Patent: Sep. 24, 1996

[54] DISKETTE HOLDER

[76] Inventor: Susan Scior, 54 State St., Brooklyn Heights, N.Y. 11201

[21] Appl. No.: 375,474

[22] Filed: Jan. 19, 1995

[51] Int. Cl.$^6$ ............ B65D 85/57; B65D 37/00
[52] U.S. Cl. ............ 206/308.3; 229/67.3
[58] Field of Search ............ 206/307, 307.1, 206/308.1, 308.2, 308.3, 309, 311, 312, 313; 229/800, 67.3, 67.4; 383/38–40

[56] References Cited

U.S. PATENT DOCUMENTS

| | | | |
|---|---|---|---|
| 1,397,000 | 11/1921 | Engel | 206/805 |
| 2,087,786 | 7/1937 | Straus | 206/805 |
| 2,323,245 | 6/1943 | Schenker | 206/311 |
| 2,333,798 | 11/1943 | Kner | 206/313 |
| 4,335,830 | 6/1982 | Garganese | 206/805 |
| 4,730,727 | 3/1988 | Petroff | 206/311 |
| 5,147,036 | 9/1992 | Jacobs | 206/313 |
| 5,161,682 | 11/1992 | Seifert et al. | 206/308.3 |

FOREIGN PATENT DOCUMENTS

| | | | |
|---|---|---|---|
| 1522977 | 10/1969 | Germany | 206/312 |
| 301699 | 12/1928 | United Kingdom | 206/309 |
| 686334 | 1/1953 | United Kingdom | 206/311 |

Primary Examiner—Jimmy G. Foster
Attorney, Agent, or Firm—Michael Ebert

[57] ABSTRACT

A holder to protectively pack several diskettes in separate pockets, the holder being fabricated from a single, rectangular blank of sheeting so die cut and scored that when the blank is folded on the score lines, there is then erected interhinged pockets. The blank is divided by longitudinal score lines into a broad central panel flanked by narrow side panels each die cut to define a series of equi-spaced lobes projecting outwardly therefrom. Transverse score lines divide the panels of the blank into a plurality of like sections, each including a pair of opposing lobes, each section being divided in half by a transverse score line extending through the center of the lobes. Diagonal score lines extending from the ends of each lobe and running through the related side panel to a common point on the adjacent longitudinal score line, form the boundaries of a gusset zone. When the side panels are folded over the central panel on the longitudinal score lines, and are then accordian-folded on the transverse score lines, the gusset zones fold in half to form in each section a pair of opposed gussets to create a pocket to accommodate a diskette.

8 Claims, 2 Drawing Sheets

DISKETTE HOLDER

BACKGROUND OF INVENTION

1. Field of Invention

This invention relates generally to a holder for packing several diskettes or similar items, and more particularly to a holder for this purpose fabricated by a single rectangular blank of flexible sheeting that is die-cut and scored so that when the blank is folded on the score lines, there is then erected a multi-pocket holder.

2. Status of Prior Art

A diskette, also known as a floppy disc, is a flexible, plastic disk coated with magnetic material and covered by a protective jacket. Diskettes are used primarily in microcomputers and minicomputers to magnetically store data, a typical size being 3-½ inches.

A common method for storing a diskette is to use for this purpose the original cardboard box in which it was packaged. One disadvantage of storing diskettes in this fashion is that in order to locate a desired diskette to be used in a computer, it then becomes necessary to take the diskettes out of their boxes in order to read their labels, and thereby find the diskette of interest. When the desired diskette is located, the others must be returned to their boxes.

It is also known to pack several diskettes in an injection molded box dimensioned to store the diskettes in stacked relation. With a box of this type, one cannot read the side labels of the diskettes stored therein. Hence to locate and retrieve a desired diskette, one has to remove the disket from the box until the desired diskette is found.

The patent to Petroff U.S. Pat. No. 4,730,727 discloses a diskette file formed by an assemblage of envelopes, each adapted to receive an individual diskette. The envelopes are adhesively bonded together and when the file is opened, the envelopes fan out to provide access to the diskettes. But only the top edge of each diskette in the open file fan is exposed, whereas the label on the side of the diskette which identifies the diskette is hidden. It therefore becomes difficult with the Petroff file to quickly locate a desired diskette.

The Henkel U.S. Pat. No. 4,762,221 discloses a portable carrier for compact discs formed by an accordian-like series of V-shaped storage elements having sleeves attached thereto to receive the compact discs.

The Traynor U.S. Pat. No. 4,653,639 discloses a protective envelope for receiving several individual magnetic discs and their jackets, the envelope including pleated panels connecting the front and back walls of the envelope. The Lu U.S. Pat. No. 4,667,819 discloses a floppy disc pack in the form of a file folder.

While the three compartment file disclosed in the Deckys U.S. Pat. No. 3,643,858 is not designed to accommodate diskettes or similar recording devices, it is of prior art background interest in that the file is formed by a single blank of sheet material.

SUMMARY OF INVENTION

The main object of this invention is to provide a multi-pocket holder for protectively packing several diskettes or similar items, the holder, when expanded, displaying the diskettes so that their identifying labels may be read, thereby facilitating the retrieval of a desired diskette.

A significant advantage of a holder in accordance with the invention is that when the holder is collapsed, it provides a compact carrier for the diskettes which can fit into a brief case or back pack.

More particularly, an object of this invention is to provide a holder of the above type fabricated from a single blank of cardboard or other flexible sheeting, whereby the holder may be mass-produced at relatively low cost.

Briefly stated these objects are attained by a holder to protectively pack several diskettes in separate pockets, the holder being fabricated from a single, rectangular blank of sheeting so die cut and scored that when the blank is folded on the score lines, there is then erected interhinged pockets.

The blank is divided by longitudinal score lines into a broad central panel flanked by narrow side panels each having a series of equi-spaced lobes projecting outwardly therefrom. Transverse score lines divide the panels into a plurality of like sections, each including a pair of opposing lobes, each section being divided in half by a transverse score line extending through the center of the lobes. Diagonal score lines extending from the ends of each lobe and running through the related side panel to a common point on the adjacent longitudinal score line, form the boundaries of a gusset zone.

When the side panels are folded over the central panel on the longitudinal score lines, and are then accordian-folded on the transverse score lines, the gusset zones fold in half to form in each section of the blank a pair of opposed gussets to create a pocket to accomodate a diskette.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

The Holder

Figure 1:
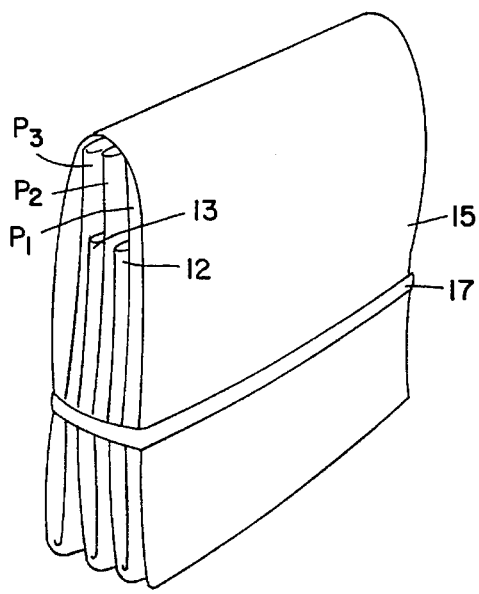
FIG. 1 is a perspective view of a preferred embodiment of a diskette holder in accordance with the invention, as seen in its collapsed, compact state.
Figure 2:
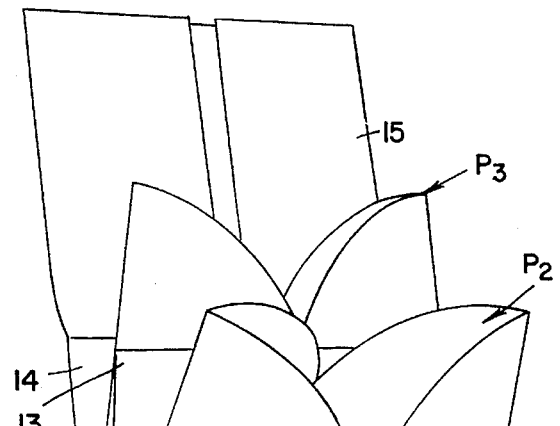
FIG. 2 shows the holder in its open state with the holder pocket exposed.
Figure 3:
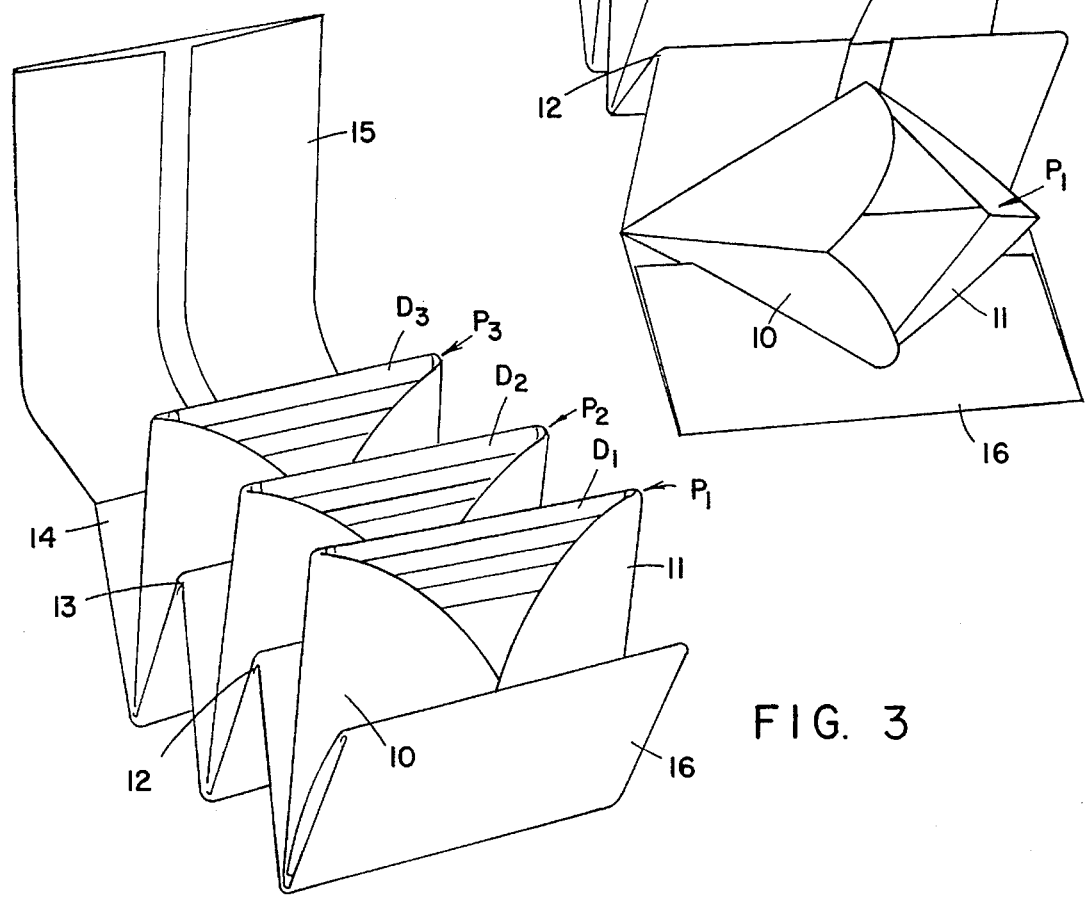
FIG. 3 shows the holder with diskettes inserted in the pockets.

Referring now to FIGS. 1 to 3, there is shown in these figures a multi-pocket holder in accordance with the invention, the holder being fabricated from a single blank of flexible sheeting, such as cardboard, heavy paper stock, or a paper-like synthetic plastic sheeting such as TYVEK. Because of its high tear strength, TYVEK is a preferred material. Also one may use non-woven fabric sheeting formed of interbonded synthetic plastic fibers.

The holder is provided with three like pockets, $P_1$, $P_2$ and $P_3$, each defined by a pair of opposed gussets 10 and 11. Received in these pockets are respective diskettes $D_1$, $D_2$ and $D_3$. Alternatively, the holder may have a larger number of pockets, and may be dimensioned to receive items similar to diskettes, such as video or audio compact discs.

The pockets defined by the opposed gussets have V-shaped inlets. These serve not only to facilitate the insertion therein of a diskette, but also to expose to view the identifying label on the front face of the diskette. Thus when the holder is open and the pockets then fan out, one may without difficult read the labels on the diskettes and thereby pick out for use in a computer a desired diskette.

Pockets $P_1$, $P_2$ and $P_3$ are interhinged by accordian folds 12 and 13, rear pocket $P_3$ being hinged by a rear fold 14 to a rear flap 15. The front pocket $P_1$ is hinged to a short front flap 16. When as shown in FIG. 1, the holder is collapsed the rear flap 15 is then folded over the pockets to overlie the short front flap 16, and is held in place by an elastic band 17 linked to rear fold 14. In practice the rear and front flaps may be provided with the male and female components of a Velcro fastener.

The Blank

Figure 5:
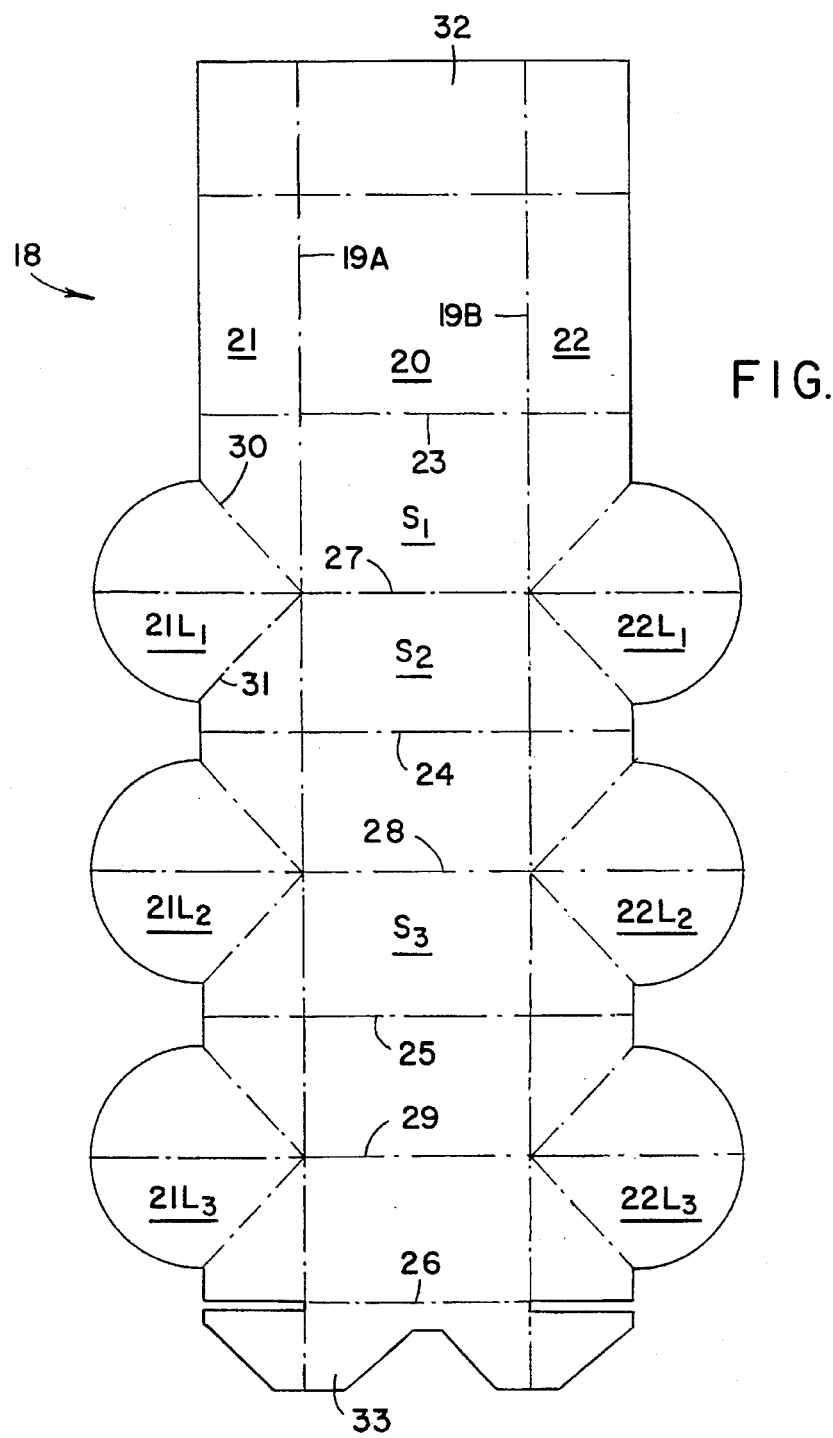
FIG. 5 illustrates the die-cut and scored blank from which the holder is fabricated.

The holder shown in FIGS. 1 to 3 is fabricated from a single rectangular blank 18 of flexible sheeting material. This blank, as shown in FIG. 5, is so scored and die cut that when the blank is folded on the score lines and erected, pockets are created that are interhinged by accordian folds.

Blank 18 is scored longitudinally along parallel score lines 19A and 19B to define a relatively broad central panel 20 flanked by side panels 21 and 22. Blank 18 is die cut to form along side panel 21 a series of three equi-spaced semi-circular lobes $21L_1$, $21L_2$ and $21L_3$ projecting outwardly from this side panel, and to form along side panel 22 a corresponding series of lobes $22L_1$, $22L_2$ and $22L_3$.

The panels of the blank which run its full length are divided by transverse score lines 23, 24, 25 and 26 into three like sections $S_1$, $S_2$ and $S_3$ each including a symmetrical pair of lobes, such as the lobes $21L_1$, and $22L_1$ included in section $S_1$. Sections $S_1$, $S_2$ and $S_3$ are in turn divided in half by respective tranverse score lines 27, 28 and 29. These lines extend through the radial center of the semicircular lobes and therefore divide each lobe in half.

Running from the ends of each lobe, such as lobe $21L_1$, through the related side panel 21 to a common point on the adjacent longitudinal score line 19A are diagonal score lines 30 and 31 to create a generally triangular gusset zone. Extending from rear section $S_1$ is a rear flap 32, and extending form the front section $S_3$ is a shorter front flap 33.

To transform the scored and die-cut blank 18 into a multi-pocket holder, the side panels 21 and 22 are folded in over the central panel 20, and are then accordian folded on the transverse score lines. The gusset zones in the side panels are folded in half to create the opposed gussets of the holder that act as the pockets for receiving the diskettes. These pockets are interhinged by the accordian folded sections of the blank.

Modification

Figure 4:
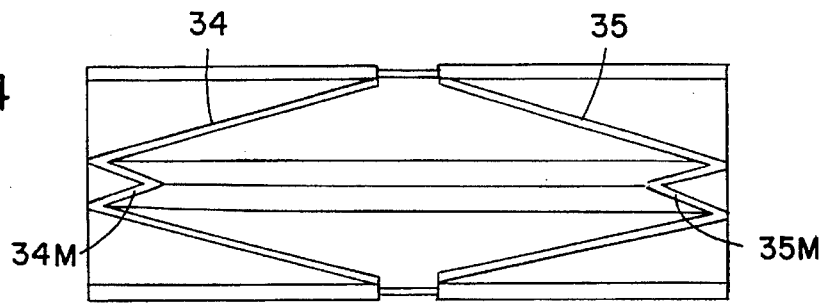
FIG. 4 illustrates one of the pockets in another embodiment of the holder.

In order to provide pockets with a greater capacity for receiving relatively thick disc-like items, the blank is scored to create, as shown in FIG. 4, a pair of opposing major gussets 34 and 35, each gusset at its apex having formed therein a minor gusset 34M and 35M which allows for expansion of the major gusset.

With a longer rectangular blank, one may create a greater number of pockets. And while the lobes are shown as being semi-circular in shape, in practice they may have a generally triangular form. In either case the resultant pockets will have a V-shaped inlet to expose the labels of the diskettes.

While there has been shown preferred embodiments of diskette holders in accordance with the invention, it will be appreciated that many changes may be made thereon without departing from the spirit of the invention.

It is to be noted that the holder is fabricated from a single blank without the need for adhesives or other fastening expedients. After the blank is folded, as shown in Fig. 2, to create the pockets, the folded over end flap 16 prevents the holder from unfolding. And when the holder is in its open state, as shown in FIG. 2, to provide access to the diskettes, it is then free standing.

I claim:

1. A holder for packing a plurality of diskettes, each having an identifying side label, said holder comprising a plurality of interhinged like pockets for receiving the diskettes, each pocket being defined by a pair of opposed gussets forming a V-shaped inlet to expose the label, said holder being fabricated from a single rectangular blank of flexible sheeting scored and die cut to create said interhinged pockets, said blank being divided by longitudinal score lines into a relatively broad central panel flanked by side panels, each side panel having a series of equi-spaced lobes projecting outwardly therefrom, the central and side panels being divided by a series of transverse score lines into like sections each including a pair of said opposed lobes, each section being divided in half by a transverse fold line running through the center of the lobes, with diagonal score lines extending from the ends of each lobe through the related side panel to a common point on the adjacent longitudinal score line to create a triangular gusset zone which when the side panels are folded over the central panel and the blank is then accordian folded on the transverse score lines, the sections are folded in half on said fold line to form in each section said opposing pair of gussets to define said pocket.

2. A holder as set forth in claim 1 in which the gussets are triangular in form having an apex and each include a minor gusset at said apex to permit expansion of the pockets.

3. A holder as set forth in claim 1 in which the lobes have a semi-circular shape.

4. A holder as set forth in claim 1 in which the blank is made of cardboard.

5. A holder as set forth in claim 1 in which the blank is made of non-woven fabric sheeting.

6. A holder as set forth in claim 5, having front and rear pockets.

7. A holder as set forth in claim 4, provided with a long flap extending from the rear pocket and a short flap extending from the front pocket, whereby when the holder is collapsed, the long flap overlies the short flap.

8. A holder as set forth in claim 1, further including an elastic band to maintain the holder in a collapsed state.

\* \* \* \* \*